US009283806B2

(12) United States Patent
Korus et al.

(10) Patent No.: US 9,283,806 B2
(45) Date of Patent: Mar. 15, 2016

(54) WHEEL ASSEMBLY FOR AN IRRIGATION SYSTEM

(71) Applicant: Lindsay Corporation, Omaha, NE (US)

(72) Inventors: Thomas J. Korus, Lindsay, NE (US); Michael S. Fredenburg, Hickman, NE (US)

(73) Assignee: Lindsay Corporation, Omaha, NE (US)

( * ) Notice: Subject to any disclaimer, the term of this patent is extended or adjusted under 35 U.S.C. 154(b) by 128 days.

(21) Appl. No.: 14/161,233

(22) Filed: Jan. 22, 2014

(65) Prior Publication Data

US 2015/0202917 A1    Jul. 23, 2015

(51) Int. Cl.
| | |
|---|---|
| *B60B 9/10* | (2006.01) |
| *B60B 9/04* | (2006.01) |
| *B60B 15/02* | (2006.01) |
| *B60C 7/10* | (2006.01) |
| *B60C 7/24* | (2006.01) |

(52) U.S. Cl.
CPC ............ *B60B 9/04* (2013.01); *B60B 15/025* (2013.01); *B60C 7/10* (2013.01); *B60C 7/24* (2013.01); *B60Y 2200/224* (2013.01); *Y10T 29/49481* (2015.01)

(58) Field of Classification Search
CPC ............. B60B 9/00; B60B 9/02; B60B 9/10; B60B 9/14; B60B 25/02; B60B 25/04; B60B 9/04; B60B 9/12; B60B 15/025; B60B 15/023; B60B 15/02; B60C 7/00; B60C 7/10; B60C 7/14; B60C 7/24; B60C 7/26; B60C 11/00; B60C 11/03; B60C 11/0311; B60C 11/0313; B60C 11/0316; B60C 11/032
USPC ............... 152/5, 6, 7, 8, 11, 13, 40; 301/10.1, 301/11.1, 62, 64.701, 64.704, 64.705, 66, 301/67, 73, 74, 79, 80
See application file for complete search history.

(56) References Cited

U.S. PATENT DOCUMENTS

| 4,944,563 | A | * | 7/1990 | Pinchbeck ............ B60C 7/24 152/323 |
| 5,380,075 | A | | 1/1995 | Haws |
| 2013/0284328 | A1 | * | 10/2013 | Korus ............ B60B 15/04 152/8 |
| 2013/0284860 | A1 | * | 10/2013 | Korus ............ A01G 25/092 248/49 |
| 2013/0284861 | A1 | | 10/2013 | Korus et al. |
| 2013/0340902 | A1 | | 12/2013 | Kemeny |
| 2014/0000777 | A1 | | 1/2014 | Choi et al. |
| 2014/0083586 | A1 | | 3/2014 | Korus |
| 2014/0110992 | A1 | | 4/2014 | Korus |

OTHER PUBLICATIONS

International Search Report and Written Opinion for PCT Application No. PCT/US2015/012466; Mailed Apr. 28, 2015.

* cited by examiner

*Primary Examiner* — John Walters
(74) *Attorney, Agent, or Firm* — Hovey Williams LLP

(57) ABSTRACT

A wheel assembly for traversing a path along a ground surface having a layer of soil, the wheel assembly comprising a central support and an airless flexible covering mounted on the central support and having a plurality of rigid sections and a plurality of flexible sections. The outwardly protruding spokes urge the rigid sections into the layer of soil when the rigid sections contact the ground surface. The flexible sections flex inwardly when the flexible sections contact the ground surface so that the rigid sections and the flexible sections cooperatively form a corrugated pattern in the ground surface without urging the soil to side margins of the airless flexible covering, the corrugated pattern having a plurality of valleys formed by the rigid sections and a plurality of peaks formed by the flexible sections.

20 Claims, 4 Drawing Sheets

WHEEL ASSEMBLY FOR AN IRRIGATION SYSTEM

BACKGROUND

The present invention relates to wheel assemblies for movable agricultural irrigation systems.

Movable agricultural irrigation systems such as center-pivot and linear systems are commonly used to irrigate large fields and typically include several irrigation spans mounted on movable support towers. Each movable support tower includes two wheel assemblies configured to traverse a path along the ground for moving the irrigation spans across the fields. After multiple passes of the irrigation system, the path often develops deep ruts in which the wheels of the support tower can become stuck. The path can be repaired by filling the ruts with soil or other material, but this requires a substantial amount of material, is time consuming, and is difficult to do without damaging crops in the process. Ruts can also be minimized by shifting the center pivot point by a few feet so that the wheel assemblies create a new path, but this results in the destruction of additional crops and may cause the wheel assemblies to become stuck or misaligned when crossing over the worn path. Also, this requires the installation of additional pipe and electrical center pivot components.

SUMMARY

The present invention solves the above-described problems and provides a distinct advance in the art of wheel assemblies for irrigation systems. More particularly, the present invention provides a wheel assembly that causes less wear on a field or other area to be irrigated while still providing excellent traction.

A wheel assembly constructed in accordance with an embodiment of the invention broadly comprises a wheel having a set of outwardly protruding spokes that define a set of recesses therebetween and a tire, track, or other covering mounted on the wheel. The covering has a set of rigid sections that are urged by the outwardly protruding spokes of the wheel into a layer of soil on the ground and a set of flexible sections that flex inwardly towards the recesses between the spokes. The wheel and the covering cooperatively form a series of alternating peaks and valleys in the soil in a generally corrugated path. During subsequent passes of the irrigation system, the rigid and flexible sections of the covering line up with the previously created peaks and valleys in the soil to greatly improve the traction of the wheel assembly. Moreover, the wheel assembly urges some of the soil from the valleys to the peaks instead of towards side margins of the path to reduce rut formation.

Another embodiment of the invention is an irrigation system support tower with two wheel assemblies. One wheel assembly has a leading wheel and the other has a trailing wheel. The leading wheel first forms alternating peaks and valleys in the soil in a generally corrugated path, as explained above. The rigid and flexible sections of the trailing wheel line up with the peaks and valleys in the soil formed by the leading wheel for greatly improved traction.

Another embodiment of the invention is a method for assembling two wheel assemblies and for determining and setting a relative rotational alignment therebetween. The method includes mounting leading and trailing wheels onto a support tower and measuring a distance between rotational reference points of the wheels. One of the wheels is rotated until the wheels are synchronized for traversing mud or soft ground or until the wheels are offset for traversing solid ground.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
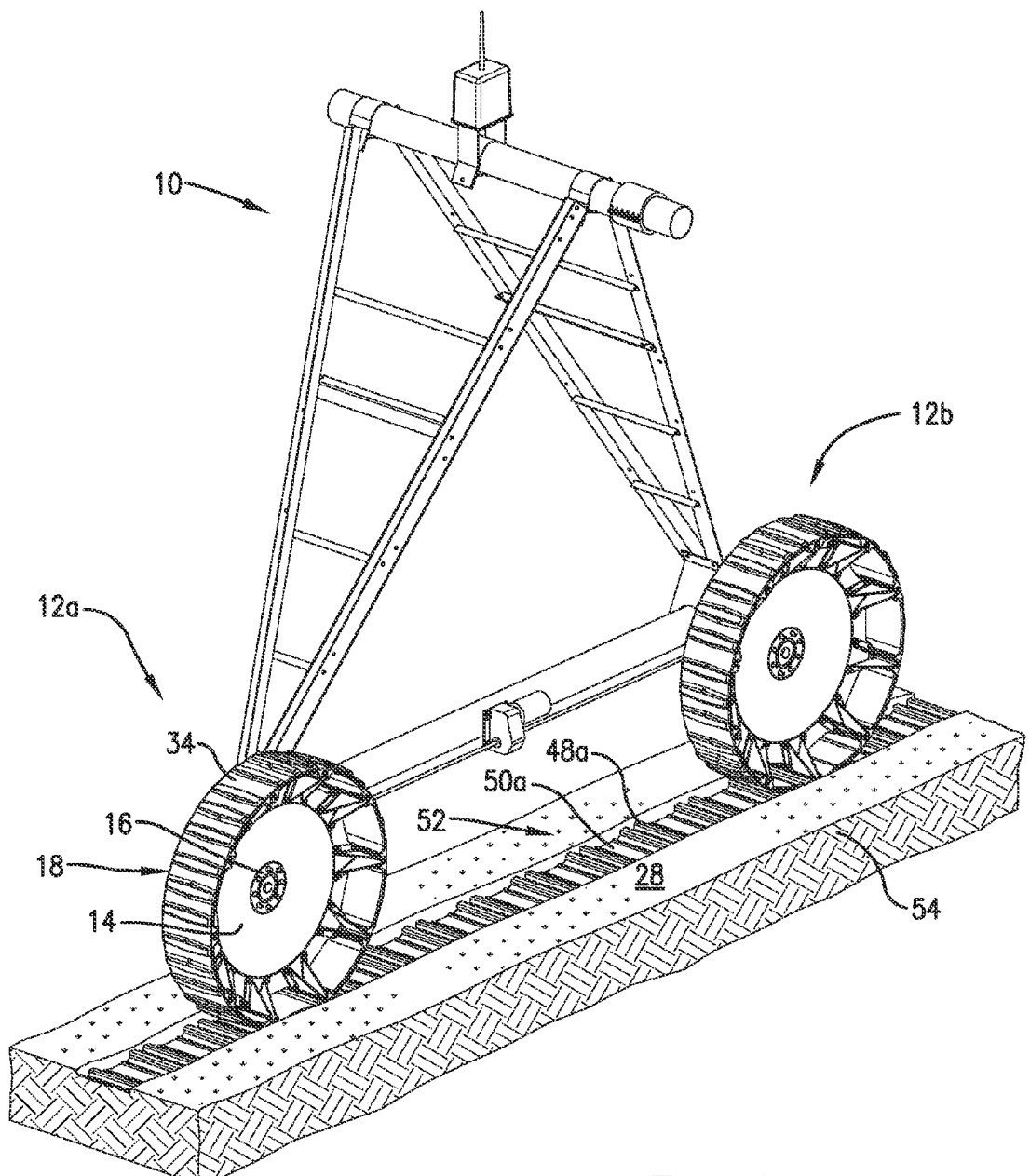
FIG. 1 is a perspective view of an irrigation system support tower on which wheel assemblies constructed in accordance with embodiments of the invention may be mounted.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to FIGS. 1-4, a movable irrigation support structure 10 with first and second wheel assemblies 12a,b constructed in accordance with embodiments of the invention is illustrated. The movable support structure 10 is part of an agricultural irrigation system such as a center-pivot or linear irrigation system, a planter, a sprayer, or any other agricultural implement. The movable support structure 10 may join and support movable spans or extensions of the irrigation system that are used to irrigate a field or other area.

The wheel assemblies 12a,b of the present invention are mounted near opposite ends of the movable support structure 10. Because the wheel assemblies 12a,b are essentially identical, only the first wheel assembly 12a will be described in detail.

Figure 2:
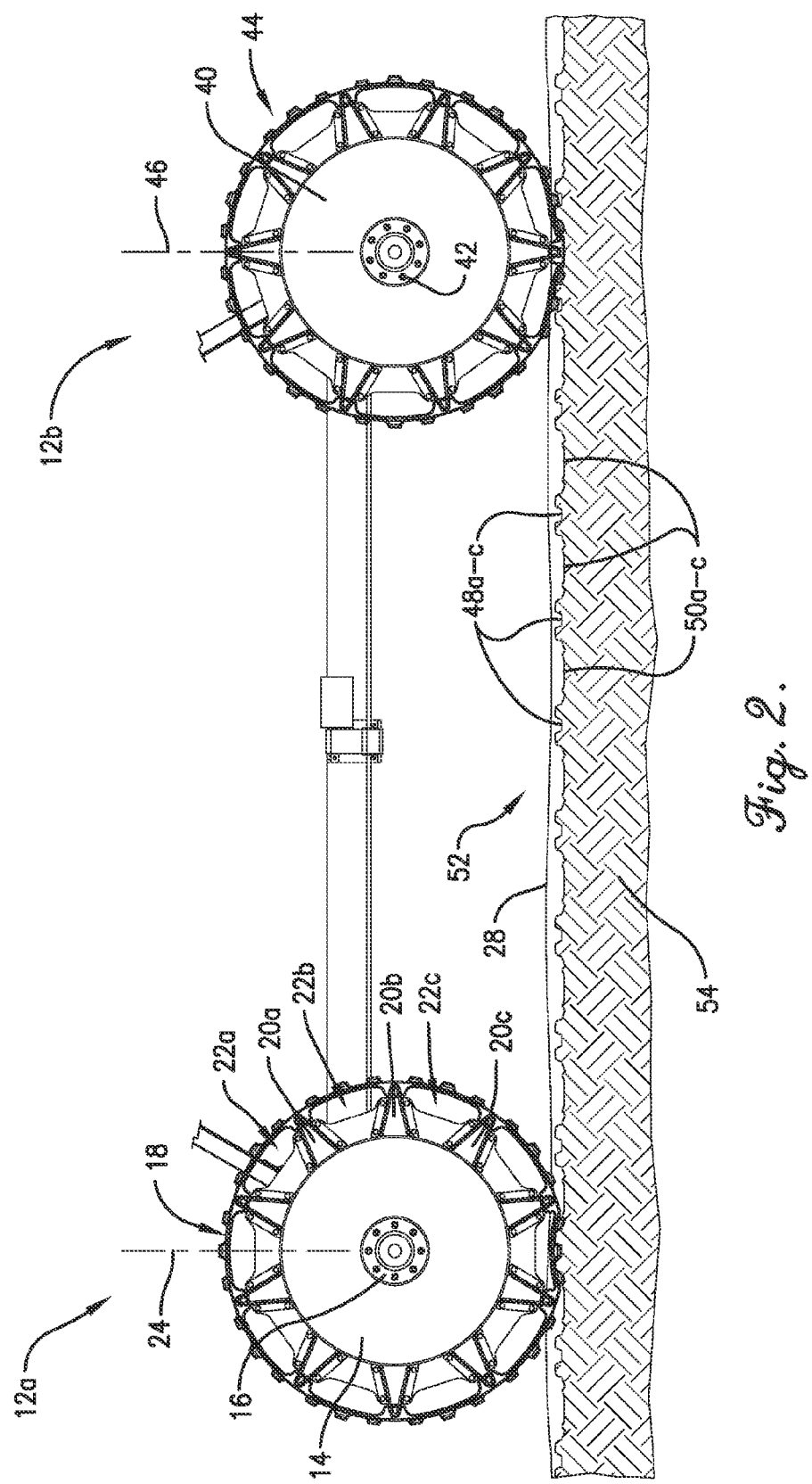
FIG. 2 is an elevational view of the wheel assemblies of FIG. 1 shown forming a generally corrugated track on a ground surface.

As best shown in FIG. 2, the first wheel assembly 12a broadly includes a central support 14 configured to be mounted on a central hub 16 of the movable support structure 10 and a tire, track, or other flexible covering 18 mounted on the central support 14.

The central support 14 may be a wheel, sprocket, cog, or similar component. The central support 14 is rotatably coupled to the movable support structure 10 via the central hub 16 and may be attached to the central support 14 via holes that receive threaded shafts of the central hub 16. The central support 14 includes a set of outwardly protruding spokes 20a-c configured to engage the airless flexible covering 18 and a set of recesses 22a-c between the outwardly protruding spokes 20a-c configured to receive the flexible sections of the airless flexible covering 18. The central support 14 may also include a first rotational reference point 24 for use in synchronizing the wheel assemblies 12a,b, as described below.

Figure 3:
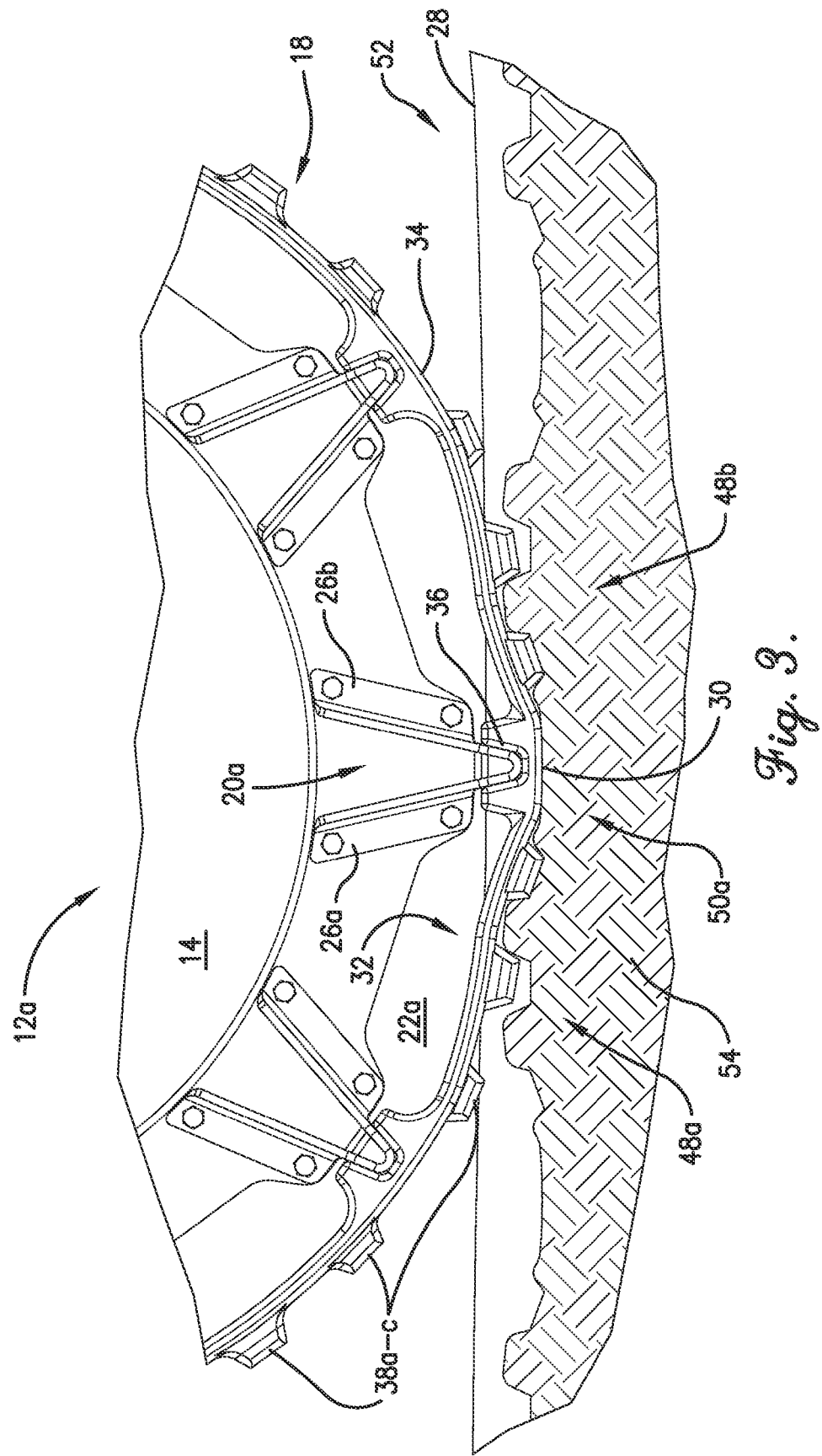
FIG. 3 is an enlarged, fragmentary elevational view of one of the wheel assemblies of FIG. 2.

Because the outwardly protruding spokes 20a-c are essentially identical, only the outwardly protruding spoke 20a will be described. The outwardly protruding spoke 20a includes prongs 26a,b and forms a U or V shape, as shown in FIG. 3. The prongs 26a,b are configured to distribute compression forces to the central support 14 for decreasing maximum point loads when the outwardly protruding spoke 20a engages the ground surface 28. The outwardly protruding spoke 20a may be attached to the central support 14 via bolts, hinges, or other fasteners and may be partially or completely detachable or retractable for mounting the airless flexible covering 18 onto the central support 14.

Figure 4:
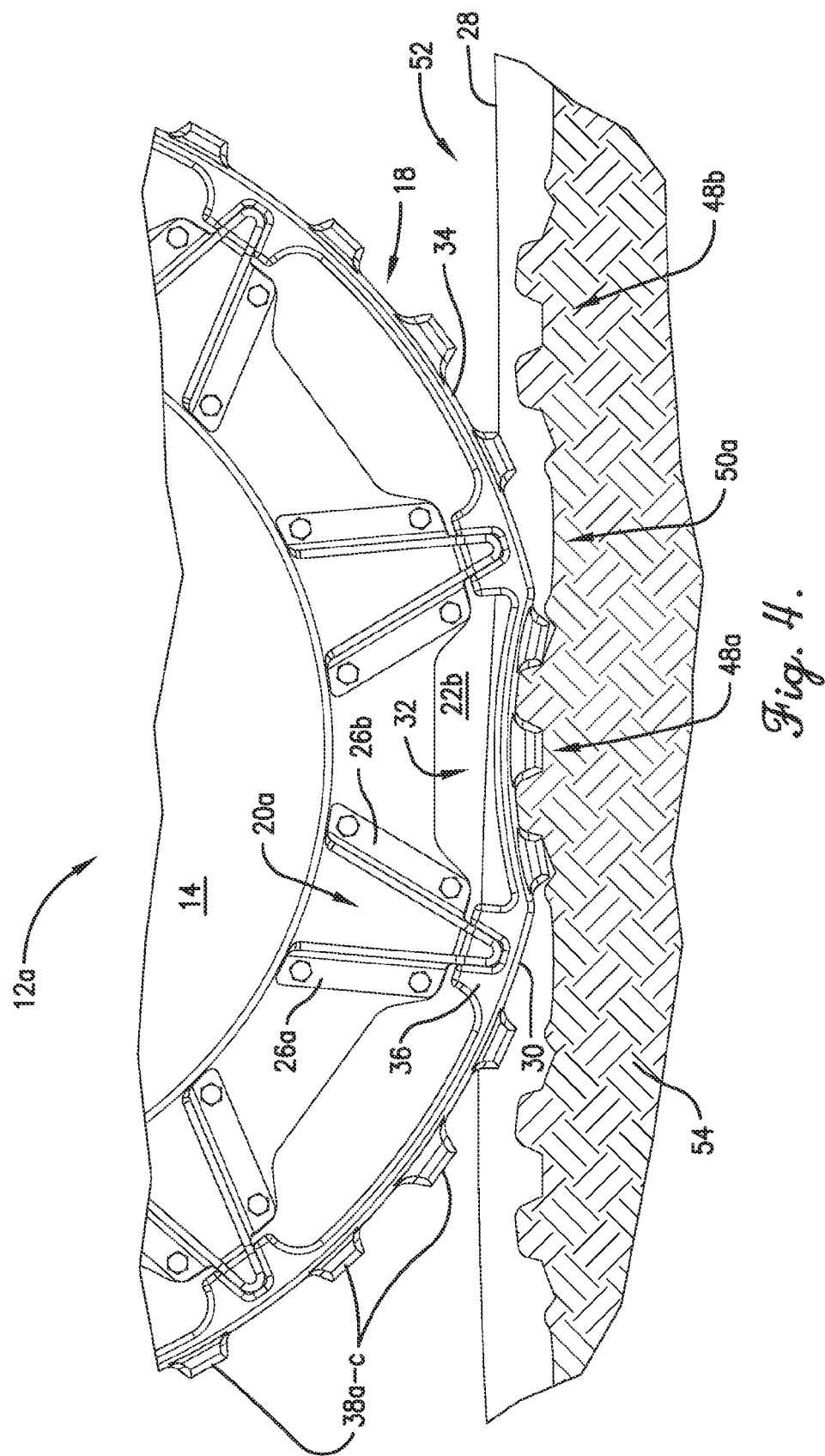
FIG. 4 is another enlarged, fragmentary elevational view of one of the wheel assemblies of FIG. 2.

The recesses 22a-c are concave areas between the outwardly protruding spokes 20a-c and each are configured to receive a flexible section of the airless flexible covering 18 (described below) when engaging the ground surface 28, as shown in FIG. 4.

The first rotational reference point 24 (FIG. 2) is provided for assisting an operator in rotationally synchronizing or off-setting the wheel assemblies 12a,b, as described below. The first rotational reference point 24 may be a marking, a fiducial, a surface, or an easily identifiable feature on the wheel assembly 12a.

The airless flexible covering 18 is provided for engaging the ground surface 28, for providing additional traction, and for protecting the central support 14, as shown in FIGS. 3 and 4. The airless flexible covering 18 may be a tire, a belt, or a linked track and is formed of rubber or other relatively pliable high friction material. The airless flexible covering 18 may be approximately 12.5 inches wide and includes a set of rigid sections (e.g., rigid section 30) configured to align with the outwardly protruding spokes 20a-c, a set of flexible sections (e.g., flexible section 32) configured to align with the recesses 22a-c, and an outer surface 34 configured to contact the ground surface 28, as described below.

Because the rigid sections are essentially identical, only the rigid section 30 will be described. The rigid section 30 includes an inwardly facing mounting boss 36 for receiving the outwardly protruding spoke 20a. The rigid section 30 may have a gradually curved contour and a thickness greater than a thickness of the adjacent flexible sections for reducing fatigue between the rigid section 30 and the adjacent flexible sections.

The flexible sections are intermediate the rigid sections. Because the flexible sections are essentially identical, only the flexible section 32 will be described. The flexible section 32 is aligned with a recess 22a and is urged into the recess 22a when engaging the ground surface 28, as best shown in FIG. 4. When not engaging the ground surface 28, the flexible section 32 may revert to an outwardly arcuate shape.

The outer surface 34 is configured to contact the ground surface 28 and is substantially flat from its left edge to its right edge. The outer surface 34 may include a set of traction lugs 38a-c spaced from each other for increased traction.

The airless flexible covering 18 may be a sacrificial part in the sense that repeated contact with the ground surface 28 and exposure to the elements over time may require the airless flexible covering 18 to be replaced, which is easier and less expensive than replacing the central support 14 or the entire wheel assembly 12a.

Turning again to FIG. 2, the second wheel assembly 12b includes a second central support 40 configured to be mounted on a second central hub 42 of the movable support structure 10, a second airless flexible covering 44 mounted on the second central support 40, and a second rotational reference point 46 for assisting the operator in synchronizing the wheel assemblies 12a,b, as described below.

The second central support 40 is essentially identical to the first central support 14, and the second airless flexible covering 44 is essentially identical to the first airless flexible covering 18. The second central support 40 is spaced from and aligned with the first central support 14 so that the second central support 40 traverses a path along the ground surface 28 after the first central support 14.

The second rotational reference point 46 is provided for assisting the operator in rotationally synchronizing or offsetting the wheel assemblies 12a,b, as described below. The second rotational reference point 46 may be a marking, a fiducial, a surface, or an easily identifiable feature on any component of the second wheel assembly 12b.

The above-described wheel assemblies 12a,b provide several advantages over conventional wheels. For example, the wheel assemblies 12a,b create a pattern in the ground that improves wheel traction on subsequent passes of the irrigation system. Moreover, the wheel assemblies 12a,b create less wear on the path traversed by the movable support structure 10 and minimize rut formation in the path.

Specifically, as shown in FIGS. 2-4, the above-described first wheel assembly 12a forms alternating peaks 48a-c and valleys 50a-c in a generally corrugated track 52 in a layer of compliant soil 54 on the ground surface 28 along the path traversed by the movable support structure 10. As a portion of the wheel assembly 12a engages the ground surface 28, the outwardly protruding spokes 20a-c of the central support 14 urge the rigid sections of the airless flexible covering 18 into the soil 54 and form the valleys 50a-c of the corrugated track 52 by urging some of the soil 54 forwards or backwards along the path, as best shown in FIG. 3. The recesses 22a-c of the central support 14 receive the flexible sections of the airless flexible covering 18 and form the peaks 48a-c between the valleys 50a-c with the soil 54 urged out of the valleys 50a-c, as best shown in FIG. 4.

Features of the second wheel assembly 12b engage common engagement points of the corrugated track 52 with features of the first wheel assembly 12a when the second wheel assembly 12b is rotationally synchronized with the first wheel assembly 12a, as shown in FIG. 2. That is, outwardly protruding spokes of the second central support 40 are urged into the valleys 50a-c of the corrugated track 52, and recesses of the second central support 40 meet the peaks 48a-c created or previously traversed by the outwardly protruding spokes 20a-c and recesses 22a-c of the first central support 14. This synchronization reinforces the corrugated track 52 and improves traction and is particularly beneficial for when the layer of soil 54 is compliant, such as after a rainfall or in muddy circumstances.

Features of the second wheel assembly 12b engage different engagement points of the corrugated track 52 than features of the first wheel assembly 12a when the second wheel assembly 12b is unsynchronized (or offset) with the first wheel assembly 12a. That is, outwardly protruding spokes of the second central support 40 meet the peaks 48a-c of the corrugated track 52, and recesses of the second central support 40 meet the valleys 50a-c created or previously traversed by the recesses 22a-c and outwardly protruding spokes 20a-c of the first central support 14. This offset alignment reduces the corrugation effect and may be beneficial when the layer of soil 54 is less compliant, such as during a dry period.

The wheel assemblies 12a,b also retain soil 54 in the path traversed by the movable support structure 10. For example, the substantially flat outer surface 34 of the first wheel assembly 12a engages the soil 54 evenly from its left edge to its right edge, which prevents much of the soil 54 from being urged to side margins of the corrugated track 52. This helps the wheel assemblies 12a,b create less wear on the path and minimize rut formation therein.

A method for assembling the wheel assemblies 12a,b, and for synchronizing or offsetting the wheel assemblies 12a,b is now described. The wheel assemblies 12a,b are assembled by mounting the first central support 14 on the first central hub 16, mounting the second central support 40 on the second central hub 42, and mounting the airless flexible coverings 18, 44 onto the respective central supports 14, 40. The wheel assemblies 12a,b are synchronized by determining and setting a relative rotational alignment of the central supports 14, 40.

The central supports 14, 40 are mounted onto the respective central hubs 16, 42 by tightening dedicated fasteners or by rotating the central supports 14, 40 onto screw threads of the central hubs 16, 42. The airless flexible covering 18 is mounted onto the central support 14, which may include detaching or adjusting the outwardly protruding spokes 20a-c by unfastening or unhinging fasteners to reduce an overall circumference of the central support 14. With the outwardly protruding spokes 20a-c removed or retracted, the airless flexible covering 18 is positioned over the central supports 14 with the rigid sections aligned with the outwardly protruding spokes 20a-c and the flexible sections aligned with the recesses 22a-c. The outwardly protruding spokes 20a-c are then fastened so that the outwardly protruding spoke 20a engages the inwardly facing mounting boss 36, for example. Mounting the second airless flexible covering 44 onto the second central support 40 is essentially identical to the above steps.

Determining and setting the relative rotational alignment of the central supports 14, 40 includes measuring a distance between the rotational reference points 24, 46 corresponding to a relative rotational alignment between the central supports 14, 40, and adjusting the first or the second central support 14, 40 until the distance is equal to a predetermined distance. To make measuring the distance between the reference points 24, 46 easier or more accurate, a rotational orientation of the first central support 14 may be set before measuring the distance by rotating the first central support 14 until a prong 26a of the outwardly protruding spoke 20a has a horizontal inclination. This inclination may be verified by placing a level device or a straight beam across two horizontally oriented prongs of the first central support 14. Optionally, an inclination of a surface of the movable support structure 10 may first be measured with a level device, and then an inclination of the prongs may be measured and compared to the inclination of the movable support structure 10 to account for uneven terrain or misaligned equipment.

Once the rotational orientation of the central support 14 is set, the distance between the rotational reference points 24, 46 is measured. This measurement is compared to a predetermined distance corresponding to a desired relative rotational alignment as described above. For example, a distance of 164 inches plus or minus 0.5 inches may correspond to a synchronized relative rotational alignment. A distance smaller or greater than 164 inches may correspond to an unsynchronized relative rotational alignment in which the outwardly protruding spokes of the first central support 14 and the second central support 40 are offset exactly one half of a pattern.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A wheel assembly for traversing a path along a ground surface having a layer of soil, the wheel assembly comprising:
   a central support having a plurality of outwardly protruding spokes that define a plurality of recesses therebetween; and
   an airless flexible covering mounted on the central support and having a plurality of rigid sections each including an inwardly facing mounting boss for aligning with and engaging the outwardly protruding spokes, and a plurality of flexible sections for aligning with the recesses,
   the outwardly protruding spokes being configured to urge the rigid sections into the layer of soil when the rigid sections contact the ground surface and wherein the recesses between the outwardly protruding spokes permit the flexible sections to flex inwardly towards the recesses when the flexible sections contact the ground surface so that the rigid sections and the flexible sections cooperatively form a corrugated pattern in the ground surface without urging the soil to side margins of the airless flexible covering, the corrugated pattern having a plurality of valleys formed by the rigid sections and a plurality of spaced peaks formed by the flexible sections.

2. The wheel assembly of claim 1, wherein the central support is a wheel and the airless flexible covering is a tire, and the tire presents an outer surface that is substantially flat between first and second edges thereof for preventing the soil from being urged to the side margins of the tire.

3. The wheel assembly of claim 1, wherein the outwardly protruding spokes are retractable for removing the airless flexible covering from or attaching the airless flexible covering to the central support.

4. The wheel assembly of claim 1, wherein the outwardly protruding spokes are removably attached to the central support for removing the airless flexible covering from or attaching the airless flexible covering to the central support.

5. The wheel assembly of claim 1, wherein the central support is attached to a support structure via threaded fasteners.

6. The wheel assembly of claim 1, wherein the outwardly protruding spokes each include two prongs collectively forming a V-shape, each prong being aligned with a prong of another protruding spoke for placing a straight edge and a level device thereon to set a rotational orientation of the central support.

7. The wheel assembly of claim 1, wherein the outwardly protruding spokes each include two prongs collectively forming a U-shape, each prong being aligned with a prong of another protruding spoke for placing a straight edge and a level device thereon to set a rotational orientation of the central support.

8. The wheel assembly of claim 1, wherein the flexible sections of the airless flexible covering each are configured to revert to an outwardly arcuate shape so as to be spaced away from the recesses when not contacting the ground surface.

9. The wheel assembly of claim 1, wherein the airless flexible covering includes a plurality of traction lugs.

10. A method of assembling first and second wheel assemblies of a support tower of a movable irrigation system, the method comprising:
mounting a first central support having a plurality of outwardly protruding spokes and a first rotational reference point onto a first central hub;
mounting a second central support having a plurality of outwardly protruding spokes and a second rotational reference point onto a second central hub spaced from the first central hub so that the second central support is spaced from the first central support and aligned with the first central support along a path for traversing;
measuring a distance between the rotational reference points to determine a relative rotational alignment of the second central support; and
adjusting the first central support or the second central support until the distance between the rotational reference points is equal to a predetermined distance.

11. The method of claim 10, wherein the predetermined distance corresponds to a synchronized relative rotational alignment such that the outwardly protruding spokes of the first central support and the outwardly protruding spokes of the second central support are configured to engage common engagement points of a substantially compliant ground surface along the path so as to form a corrugated pattern in the substantially compliant ground surface for improving traction thereon.

12. The method of claim 11, wherein the first central support presents a surface for checking an inclination of the surface corresponding to a desired rotational orientation of the first central support.

13. The method of claim 11, further comprising:
checking an inclination of a support structure and rotating the first central support until the inclination of the surface is equal to the inclination of the support structure.

14. The method of claim 10, wherein the predetermined distance corresponds to an unsynchronized relative rotational alignment such that the outwardly protruding spokes of the first central support and the outwardly protruding spokes of the second central support are configured to engage different engagement points of a substantially non-compliant ground surface along the path so as to reduce a corrugation effect on the substantially non-compliant ground surface for improving traction thereon.

15. The method of claim 10, further comprising:
setting a rotational orientation of the first central support before measuring the distance between the rotational reference points.

16. The method of claim 10, further comprising:
mounting a first and a second airless flexible covering on the first and the second central support, respectively.

17. The method of claim 16, wherein the outwardly protruding spokes are removably attached to the central support for removing the airless flexible covering from or attaching the airless flexible covering to the central support.

18. A support tower for a movable irrigation system for traversing a path along a ground surface having a layer of soil, the support tower including first and second wheel assemblies collectively comprising:
a leading wheel and a trailing wheel aligned with and spaced from each other along the path, each wheel having a plurality of outwardly protruding spokes defining a plurality of recesses therebetween, each wheel including a reference point for rotationally synchronizing the wheels; and
an airless flexible tire mounted on each wheel and having a plurality of rigid sections each including an inwardly facing mounting boss for aligning with and engaging the outwardly protruding spokes, and a plurality of flexible sections for aligning with the recesses, the outwardly protruding spokes being configured to urge the rigid sections into the layer of soil when the rigid sections contact the ground surface and wherein the recesses between the outwardly protruding spokes permit the flexible sections to flex inwardly towards the recesses when the flexible sections contact the ground surface so that the rigid sections and the flexible sections cooperatively form a corrugated pattern in the ground surface without urging the soil to side margins of the airless flexible covering, the corrugated pattern having a plurality of valleys formed by the rigid sections and a plurality of spaced peaks formed by the flexible sections, and the airless flexible tires each having a plurality of outwardly facing traction lugs for improving traction.

19. The support tower of claim 18, wherein each tire presents an outer surface that is substantially flat between first and second edges thereof for preventing the soil from being urged to the side margins of the tire.

20. The wheel assembly of claim 18, wherein each wheel includes a reference point for rotationally offsetting the wheels.

* * * * *